(12) United States Patent
Thompson et al.

(10) Patent No.: US 6,646,441 B2
(45) Date of Patent: Nov. 11, 2003

(54) WELL LOGGING SYSTEM FOR DETERMINING RESISTIVITY USING MULTIPLE TRANSMITTER-RECEIVER GROUPS OPERATING AT THREE FREQUENCIES

(75) Inventors: Larry W. Thompson, Willis, TX (US); MacMillian M. Wisler, Kingwood, TX (US); Jian-Qun Wu, Houston, TX (US)

(73) Assignee: Precision Drilling Technology Services Group Inc., Calgary (CA)

( * ) Notice: Subject to any disclaimer, the term of this patent is extended or adjusted under 35 U.S.C. 154(b) by 12 days.

(21) Appl. No.: 10/053,043

(22) Filed: Jan. 19, 2002

(65) Prior Publication Data

US 2003/0137301 A1 Jul. 24, 2003

(51) Int. Cl.$^7$ ................................................ G01V 3/08
(52) U.S. Cl. ........................................ 324/338; 324/335
(58) Field of Search ................................ 324/338, 335, 324/336, 339, 340, 342, 343, 346, 369; 702/7, 6; 336/84 R, 84 M; 175/45

(56) References Cited

U.S. PATENT DOCUMENTS

| | | |
|---|---|---|
| 4,451,789 A | 5/1984 | Meador |
| 4,899,112 A | 2/1990 | Clark et al. |
| 4,968,940 A | 11/1990 | Clark et al. |
| 5,081,419 A | 1/1992 | Meador et al. |
| 5,138,263 A | 8/1992 | Towle |
| 5,157,605 A | 10/1992 | Chandler et al. |
| 5,278,507 A | 1/1994 | Bartel et al. |
| 5,469,062 A | 11/1995 | Meyer, Jr. |
| 5,530,358 A | 6/1996 | Wisler et al. |
| 5,574,374 A | 11/1996 | Thompson et al. |
| RE35,386 E | 12/1996 | Wu et al. |
| 5,678,643 A | * 10/1997 | Robbins et al. ............... 175/45 |
| 5,869,968 A | * 2/1999 | Brooks et al. .............. 324/328 |
| 6,400,148 B1 | * 6/2002 | Meyer et al. ............... 324/303 |

OTHER PUBLICATIONS

U.S. patent application Ser. No. 10/053,041, Thompson et al.

* cited by examiner

*Primary Examiner*—Jay Patidar
*Assistant Examiner*—Subhash Zaveri
(74) *Attorney, Agent, or Firm*—Patrick H. McCollum

(57) ABSTRACT

An electromagnetic wave propagation resistivity borehole logging system comprising multiple groups of electromagnetic transmitter-receiver arrays operating at three frequencies. The borehole logging tool component of the system employs eight transmitters and four receivers. The transmitters and receivers are disposed axially and symmetrically along the major axis of the tool to form four group pairs. Each group pair consists of a transmitter-receiver groups axially and symmetrically on opposing sides of a reference point on the tool. Each, transmitter-receiver group consists of one transmitter assembly and two receiver assemblies. Each transmitter-receiver group is operated at two of three operating frequencies which are 100 kHz, 400 kHz and 2 MHz. The transmitter and receiver assemblies are fabricated to yield azimuthally symmetrical resistivity measurements in a plane essentially perpendicular to the axis of the tool. The system can be embodied as a logging-while-drilling system or as a wireline logging system.

29 Claims, 7 Drawing Sheets

A - A'    B - B'

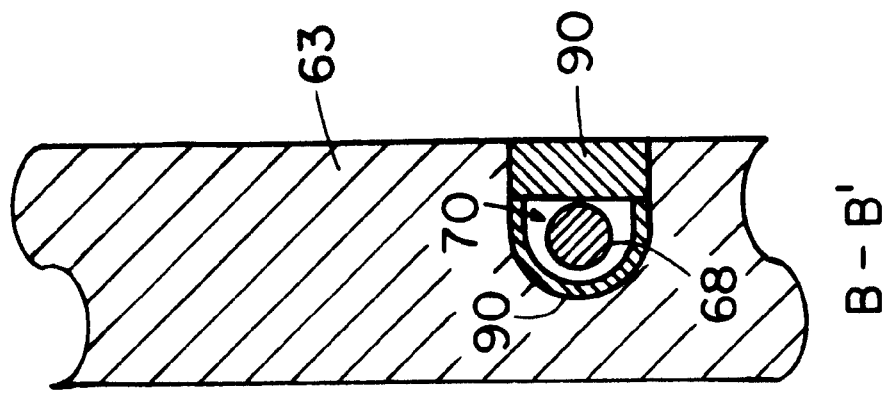
Fig. 7
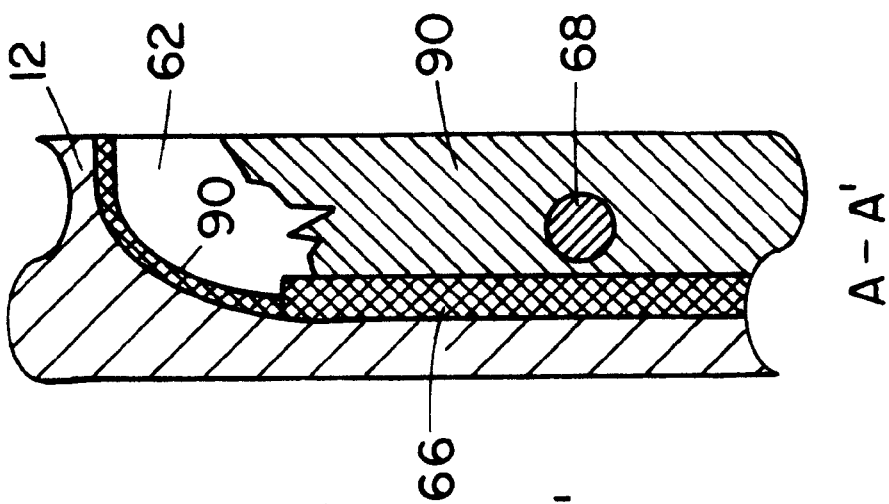
Fig. 6
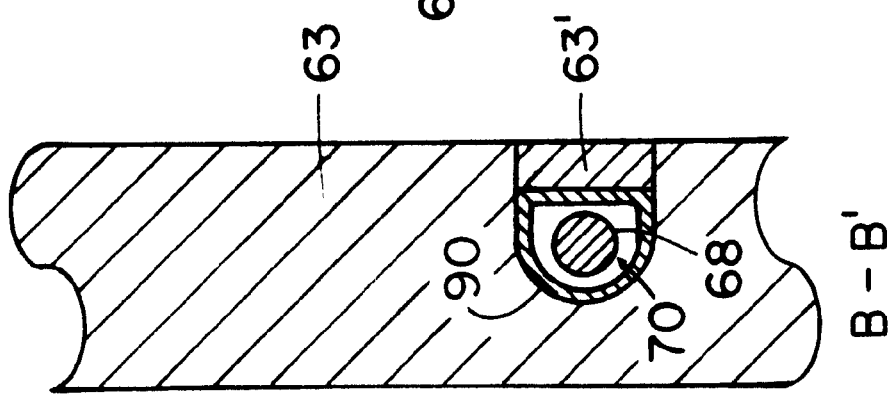

WELL LOGGING SYSTEM FOR DETERMINING RESISTIVITY USING MULTIPLE TRANSMITTER-RECEIVER GROUPS OPERATING AT THREE FREQUENCIES

BACKGROUND OF THE INVENTION

1. Field of the Invention

This invention is related to measurement of formation properties penetrated by a well borehole, and more particularly related to an electromagnetic wave propagation resistivity well logging system comprising multiple groups of electromagnetic transmitter-receiver arrays operating at three frequencies, with the lowest frequency being about 100 kHz. Resistivity measurements are essentially azimuthally symmetrical and in a toroidal volume whose axis is parallel to the axis of the well borehole.

2. Background of the Art

Earth formation resistivity is an important parameter in delineating hydrocarbon and saline water content within the pore space of the formation. Formations containing hydrocarbon in the pore space are typically more resistive than formations of the same lithology and porosity containing saline water in the pore space. Resistivity measurements are typically made by conveying an instrument or "tool" along a well borehole penetrating the earth formation. The tool can be conveyed by a drill string thereby yielding a measure of resistivity while the borehole is being drilled. This type of system is commonly referred to as a logging-while-drilling (LWD) system. Alternately, the tool can be conveyed along the borehole by means of and electrical or fiber optic cable after drilling has been completed. This type of system is commonly referred to as a "wireline" logging system.

Resistivity logging systems are typically electromagnetic, and comprise at least one transmitter and at least one receiver. Classes of resistivity logging systems are typically based upon the frequencies at which they operate. With respect to the lowest end of the frequency spectrum, there are electrode systems that operate in a range of around 1 kiloHertz (kHz). These systems rely upon the conduction of current through drilling fluid or drilling "mud" as part of the current flow path that also includes electrodes and the surrounding formation. Since the mud must be conductive, these systems will not operate in low conductivity mud systems such as oil based muds. With respect to the next frequency range, there are induction logging systems that operate in the range of 20 to 100 kHz. An induction log generates a magnetic field in the formation to produce secondary current flows within the formation. The secondary currents set up a secondary magnetic field, which induces current in one or more receiver coils in proportion to the magnitude of the secondary current flow. The induced current is directly proportional to the resistivity of surrounding formation. A measure of induced current can, therefore, be related to formation resistivity. Conductive mud is not required for operation. With respect to a much higher range of frequencies in the spectrum, there are electromagnetic wave propagation (EWP) systems that operate in the 500 kHz to 4 megaHertz (MHz) range. These systems typically use measured amplitude attenuation and phase shifts of induced currents to yield a measure of formation resistivity. Additional information on the basic concepts of prior art resistivity logging systems can be found in U.S. Pat. No. 5,081,419 to Meador et al.

Resistivity log measurements are affected by numerous perturbing factors in addition to the parameter of interest, namely the unperturbed or "true" resistivity of the formation penetrated by the borehole. The perturbing factors include borehole size, borehole ruggosity, invasion of the drilling mud into formation in the immediate vicinity of the borehole, the resistivity of adjacent formations, and the conductivity of borehole fluid. There are also design and operation properties of the logging system which affect the measure of true formation resistivity. These properties include operating frequency, spacings of transmitter-receiver groups, cross-talk between transmitter-receiver groups, balance of transmitter-receiver groups, and the linearity of transmitter and receiver electronic circuits.

Transmitter-receiver operating frequency and spacing can be used to compensate for the adverse effects of borehole conditions and formation invasion. Holding all other variables constant, the depth of investigation of a given transmitter-receiver pair increases with increasing transmitter-receiver spacing. Again holding all other variables constant including transmitter-receiver spacing, the depth of investigation increases as operating frequencies decrease. Once again, holding all other variables constant, it is known in the art that resistivity derived from attenuation measurements are in general deeper than resistivity derived from phase measurements In order to determine and to compensate for perturbing effects of borehole conditions, invasion and adjacent bed boundaries, prior art resistivity logging systems have employed a plurality of transmitter-receiver groups operating at multiple frequencies. Furthermore, symmetrically arranged multiple transmitter-receiver pairs have been used to compensate for the effects of temperature and pressure changes on the antennas and electronics at differing spacings. Prior art EWP systems have, however, been limited to operating frequencies of about 400 kHz or greater. Lower operating frequencies such as 100 kHz at greater transmitter-receiver spacings will significantly increase depth of investigation of a logging system. This is highly desirable in minimizing the adverse depth of investigation related perturbations discussed previously. At operating frequencies around 100 kHz, however, phase and amplitude differences are relatively small and difficult to measure accurately. Furthermore, electronic circuits controlling the transmitters and receivers must be extremely linear for compensation of symmetric transmitter-receiver pairs to be effective. At increased spacing, low noise and high efficiency transmitters and receivers are needed.

SUMMARY OF THE INVENTION

The present invention is an electromagnetic wave propagation (EWP) resistivity logging system that can be embodied as a logging-while-drilling system or as a wireline logging system. The tool portion of the system comprises a plurality of transmitter-receiver groups consisting of a total of eight transmitters and four receivers disposed axially and symmetrically about a reference point on the tool. A transmitter of a given transmitter-receiver group is activated, and induced signals are measured at preferably two axially spaced receivers within the group. A transmitter of a symmetrically opposing transmitter-receiver group is then activated and induced signals are measured in the two axially spaced receivers within that group. The system preferably uses three operating frequencies, with each transmitter-receiver group operating at two or three operating frequencies. Each transmitter within a group is sequentially activated at one or more of the operating frequencies. Preferred operating frequencies are 2 MHz, 400 kHz and 100 kHz. Two transmitters disposed at a maximum spacing on opposing sides of the reference point are operated at 100 kHz and 400 kHz. The six remaining transmitters symmetrically disposed at three lesser spacings on opposing sides of the reference point are operated at 400 kHz and 2 MHz. Two receivers disposed on opposing sides of the reference point are operated at 100 kHz and 400 kHz. The remaining two receivers disposed on opposing sides of the reference point at a lesser spacing are operated at 400 kHz and 2 MHz. The transmitters and receivers are powered and operated by low noise, highly linear electronic circuitry within the tool. The tool is conveyed along a borehole, penetrating an earth formation, by a conveyance system which includes a surface conveyance unit and a member which extends from the tool to a surface conveyance unit. If the system is embodied as a LWD system, the surface conveyance unit is a drilling rig and the member is a drill pipe string. If the system is embodied as a wireline logging system, the surface conveyance unit is a wireline draw works and the member is a wireline logging cable. Other conveyance systems can be used to convey the tool along the borehole. These conveyance systems include a slick line, coiled tubing, and coiled tubing with a conductor embedded within the tubing. The surface conveyance unit also cooperates with surface equipment which powers and controls the operation of the tool. The surface equipment also preferably cooperates with a computer or processor which is programmed to record responses from the four receivers, compute amplitude attenuation and phase shift, and transform these computations into parameters of interest, such as true formation resistivity.

It should be understood that alternate transmitter-receiver groupings can be used at one, two or all three of the operating frequencies. These alternate embodiments can be combined to enhance measurements for various applications and borehole environs.

Each transmitter and receiver element comprises a plurality of axial slots fabricated within the wall of the tubular pressure housing member of the tool. Alternately, the transmitter and receiver elements can be fabricated as separate units and subsequently integrated into the housing member. Each slot is defined by adjacent lands with an outer radius essentially equal to the outer radius of the tool housing, and a surface of lesser radius. An essentially circular antenna, in a plane perpendicular to the axis of the tubular housing member, traverses each slot and traverses each land through a radial antenna pathway therein. Magnetic reluctance material such as ferrite is positioned within the slots on the surface of lesser radius. This increases antenna efficiency by increasing gain for a given power level. In an alternate embodiment of the invention, the antenna pathways of the low frequency transmitters and receivers are coated with highly conducting material to increase antenna efficiency. In yet another embodiment, the interiors of the slots are also coated with the highly conducting material still further increasing antenna efficiency. This increase transmitter efficiency enables the use of the 100 kHz or lower operating frequency at the maximum transmitter spacings.

By using an 100 kHz or even lower operating frequency along with higher operating frequencies, and by using the previously discussed transmitter-receiver group spacings, depth of investigation of the tool is greater than any known prior art EWP resistivity logging system. This increased depth of investigation is advantageous in obtaining true formation resistivity in highly invaded formations. The increased depth of investigation is also advantageous when the tool is embodied as a geosteering system which measures the distance the distance between the tool and adjacent formations of contrasting resistivity.

BRIEF DESCRIPTION OF THE DRAWINGS

So that the manner in which the above recited features, advantages and objects the present invention are obtained and can be understood in detail, more particular description of the invention, briefly summarized above, may be had by reference to the embodiments thereof which are illustrated in the appended drawings.

FIG. 6 illustrates a transmitter or receiver antenna pathway interior coated with highly conducting material to increase efficiency;

FIG. 7 illustrates the interior of a transmitter or receiver axial slot coated with highly conducting material to increase efficiency; and FIG. 8 illustrated a transmitter or receiver pathway interior and outer band defining the pathway fabricated with highly conducting material to increase efficiency.

DETAILED DESCRIPTION OF THE PREFERRED EMBODIMENTS

Figure 1:
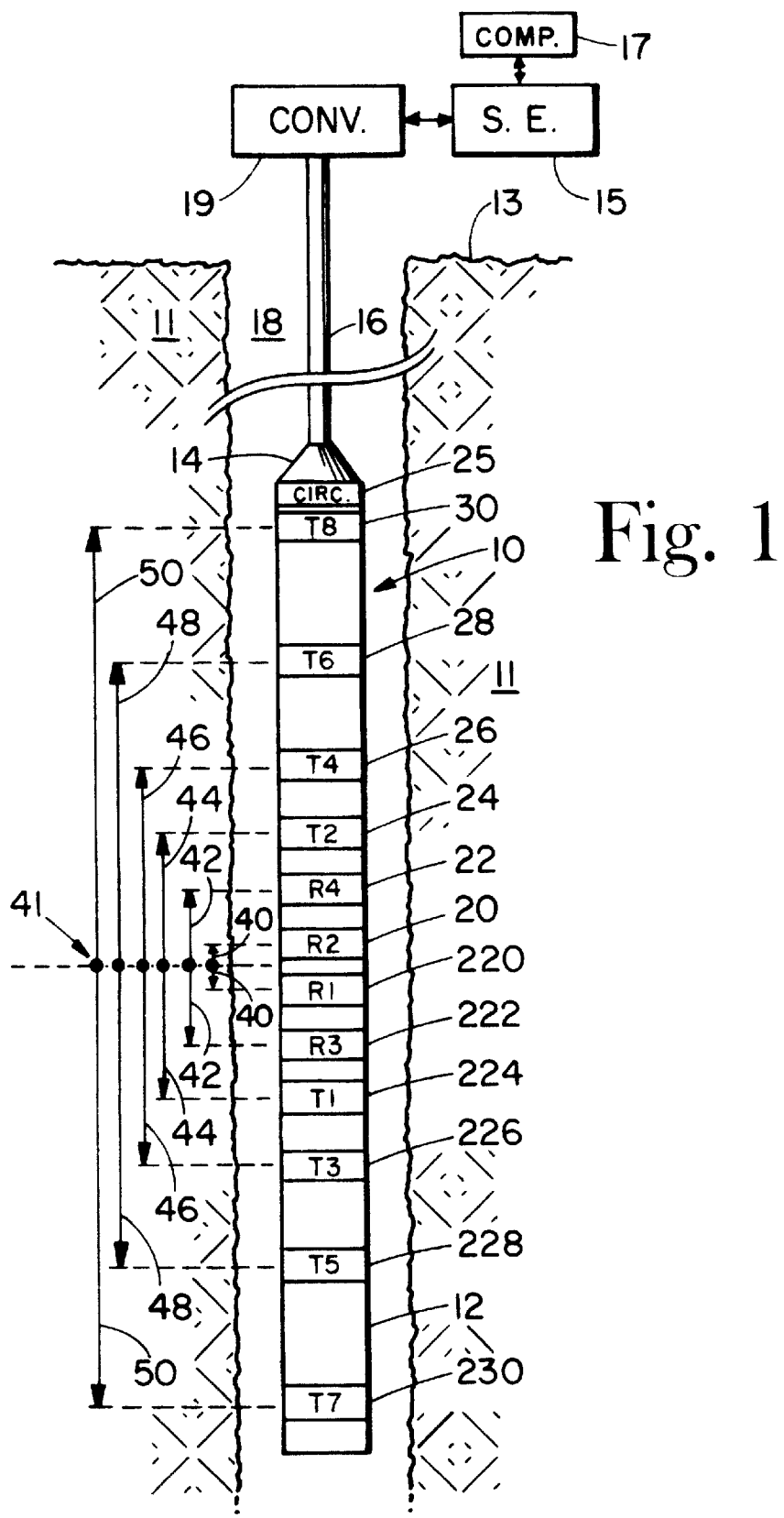
FIG. 1 depicts the EWP resistivity logging system deployed within a well borehole.

Attention is directed to FIG. 1 which conceptually illustrates the EWP resistivity logging system deployed within a well borehole 18 penetrating an earth formation 11. The tool portion of the system is denoted as a whole by the numeral 10 and comprises a tubular pressure housing 12 and a plurality of transmitter-receiver groups consisting of a total of eight transmitters and four receivers disposed axially and symmetrically about a reference point 41 on the tool. Transmitters T7 and T8, identified at 230 and 30, respectfully, are axially spaced a distance 50 on opposing sides of the reference point 41. Transmitters T5 and T6, identified at 228 and 28, respectfully, are axially spaced a distance 48 on opposing sides of the reference point 41. Transmitters T3 and T4, identified at 226 and 26, respectfully, are axially spaced a distance 46 on opposing sides of the reference point 41. Transmitters T1 and T2, identified at 224 and 24, respectfully, are axially spaced a distance 44 on opposing sides of the reference point 41. Receivers R3 and R4, identified at 222 and 22, respectfully, are axially spaced a distance 42 on opposing sides of the reference point 41. Receivers R1 and R2, identified at 220 and 20, respectfully, are axially spaced a distance 40 on opposing sides of the reference point 41.

A transmitter of a given transmitter-receiver group is activated and induced signals are measured at two axially spaced receivers within the group. As an example, transmitter T1 at 224 is activated and induced signals are measured at receivers R1 and R2 at 220 and 20, respectively. Transmitter T2 at 24 of a symmetrically opposing transmitter-receiver group is then activated and induced signals are measured in the two axially spaced receivers R1 and R2 at 220 and 20, respectively. As an additional example, transmitter T7 at 230 is activated and induced signals are measured at receivers R3 and R4 at 222 and 22, respectively. Transmitter T8 at 30 of a symmetrically opposing transmitter-receiver group is then activated and induced signals are measured in the two axially spaced receivers R3 and R4 at 222 and 22, respectively.

Three operating frequencies are used, and each transmitter is sequentially activated at one of two of the operating frequencies. Preferred operating frequencies are 2 MHz, 400 kHz and 100 kHz. Frequencies can be varied. As an example, the lowest operating frequency can be as low as about 20 kHz. Pairs of operating frequencies for the transmitters and receivers are tabulated in Table 1

TABLE 1

| Transmitter or Receiver | First Frequency | Second Frequency |
|---|---|---|
| T1 | 400 kHz | 2 MHz |
| T2 | 400 kHz | 2 MHz |
| T3 | 400 kHz | 2 MHz |
| T4 | 400 kHz | 2 MHz |
| T5 | 400 kHz | 2 MHz |
| T6 | 400 kHz | 2 MHz |
| T7 | 100 kHz | 400 kHz |
| T8 | 400 kHz | 400 kHz |
| R1 | 400 kHz | 2 MHz |
| R2 | 400 kHz | 2 MHz |
| R3 | 100 kHz | 400 kHz |
| R4 | 100 kHz | 400 kHz |

Typical spacings are spacing 50=80 inches, spacing 48=46 inches, spacing 46=30 inches, spacing 44=20 inches, spacing 42=12 inches, and spacing 40=4 inches. It should be understood that the invention is not strictly limited by these spacings, and that other spacings can be employed.

Still referring to FIG. 1, it should be noted that transmitters T7 and T8 at a maximum spacing 50 on opposing sides of the reference point 41 are operated at 100 kHz and 400 kHz. These transmitters along with receivers R3 and R4 comprise the transmitter-receiver group that yields the deepest depth of investigation when operated at a frequency of 100 kHz. The six remaining transmitters and two remaining receivers symmetrically disposed at three lesser spacings on opposing sides of the reference point 41 are operated at 400 kHz and 2 MHz. These form transmitter-receiver groups that yield progressively lesser depths of investigation. The transmitters and receivers are powered and operated by low noise, highly linear electronic circuitry 25 disposed within the tool 10. Details of the electronics are disclosed in U.S. Pat. No. 5,574,374 to Thompson and Wisler, which is hereby incorporated into this disclosure by reference. The number of transmitter-receiver groups can be varied, but at least one group operating at a frequency or 100 kHz and a relatively long axial spacing is required to obtain the enhanced depth of investigation.

Still referring to FIG. 1, the tool 10 is conveyed along the borehole by a conveyance system 19 that cooperates with a member 16. The member 16 is connected to the tool at a first end by a connector 14 and is connected to the conveyance unit 19 at a second end. The surface conveyance unit 19 is located at the surface of the earth 13. If the tool is embodied as a logging-while drilling system, the surface conveyance unit 19 is a drilling rig and the member 16 is a drill pipe string. If the system is embodied as a wireline logging system, the surface conveyance system 19 is a wireline draw works and the member 16 is a wireline logging cable. Other conveyance systems, such as a slickline system, can be used to convey the tool 10 along the borehole 18. The surface conveyance unit 19 typically cooperates with surface equipment 15 that powers and controls the downhole tool 10. The surface equipment preferably 15 preferably cooperates with a computer or processor 15 which is programmed to record measurements from the four receivers, compute amplitude attenuation and phase shift, and transform these computations into parameters of interest, such as true formation resistivity. Methods for processing data from a plurality of transmitter-receiver groups are disclosed in U.S. Pat. Nos. 4,899,112 and 4,968,940 to Clark et al, which are hereby incorporated into this disclosure by reference. Additional information on the basic operational concepts of the EWP logging system can be found in U.S. Pat. No. 5,081,419 to Meador et al., which is hereby incorporated into this disclosure by reference.

In an alternate embodiment of the invention, some transmitter pairs can be operated at all of the three operating frequencies. As an example, transmitters T5 and T6 can be operated at the three operating frequencies. Operating at 100 kHz, signals are received at receivers R3 and R4. Operating at 400 kHz and 2 MHz, signals are received at receivers R1 and R2. This embodiment is summarized in Table 2.

TABLE 2

| Transmitter or Receiver | First Frequency | Second Frequency | Third Frequency |
|---|---|---|---|
| T5 | 400 kHz | 2 MHz | 100 kHz |
| T6 | 400 kHz | 2 MHz | 100 kHz |
| R3 | 100 kHz | | |
| R4 | 100 kHz | | |
| R1 | 400 kHz | 2 MHz | |
| P2 | 400 kHz | 2 MHz | |

In yet another alternate embodiment, all four receivers simultaneously receive signals at one of the three operating frequencies. Using this embodiment, a second set of receiver response differences can be computed and combined with an independent first set of receiver response differences to obtain a measurement which is highly sensitive to bed boundaries. Still other embodiments employ various receiver responses to various transmitters operating at one or more operating frequencies to enhance measurements for various applications and borehole environs. These include (a) at least one antenna transmitting at at least three frequencies, and at least one antenna operating to receive at least three different frequencies; (b) at least one antenna operating to receive at least three frequencies, and at least a second antenna and a third antenna forming a pair of antenna for transmitting or for receiving at least three different frequencies; and (c) at least three pairs of antenna transmitting at first and second frequencies, at least a fourth pair of antenna for transmitting signals at at least the second and a third frequencies, at least a first pair of antenna for receiving at the first and the second frequencies, and at least a second pair of antenna for receiving at the second and the third frequencies.

Figure 2:
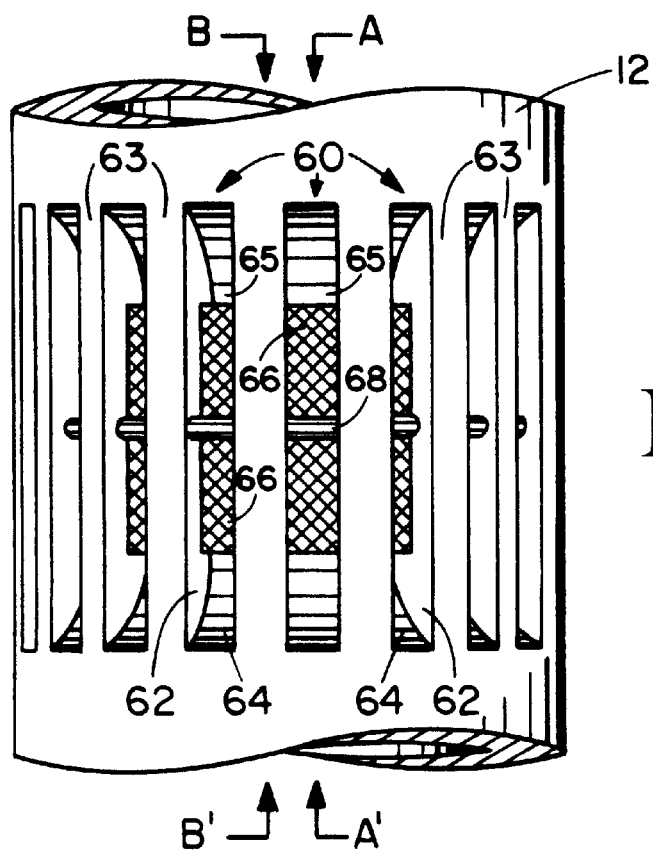
FIG. 2 is a side view of a transmitter or receiver element showing a plurality of axial slots, an antenna passing there through, and magnetic reluctance material disposed equally within each slot and on the surface of reduced radius.

FIG. 2 is a side view of a transmitter or receiver element of the logging system. The outer peripheral surface of the tool housing is shown at 12. A plurality of axial slots 60 are disposed around the peripheral surface of the housing 12, with the slots being defined by regions of reduced radial dimensions 65 (best seen in FIG. 3a) and alternating land members 63. An antenna 68, which is essentially circular and in a plane perpendicular to the major axis of the housing 12, passes through the alternating slots 60 and lands 63.

Figures 3A, 3B:
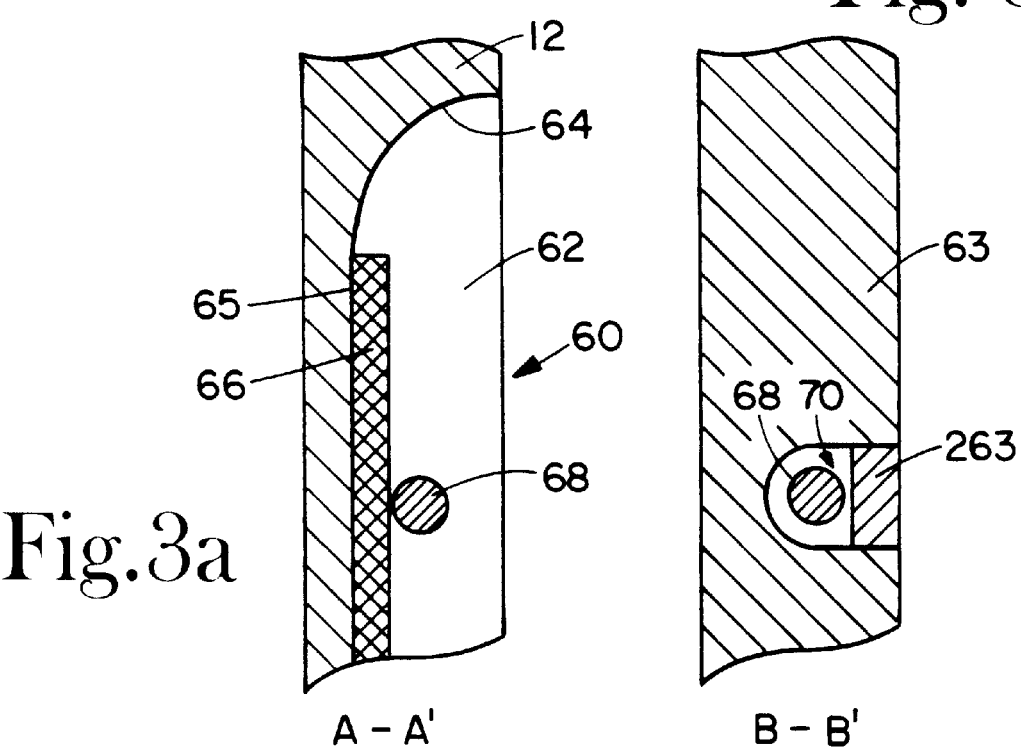
FIG. 3a is a cross sectional view of a transmitter or receiver through an axial slot.
FIG. 3b is a cross sectional view of a transmitter or receiver through a land between slots.

FIG. 3a is a sectional view at A–A' through a slot 60. Magnetic reluctance material 66 such as ferrite, is positioned within the slot on the surface of reduced radial dimension 65. This increases antenna efficiency by increasing gain for a given power level. Embodied as shown in FIG. 2, equal amounts of ferrite are disposed at the same position on the surface 65 of each slot. This embodiment yields symmetrical resistivity measurements essentially in a plane perpendicular to the axis of the tool 10.

FIG. 3b is a sectional view at B–B' through a land 63. The antenna 68 passes through a radial antenna pathway 70 which is defines by a groove machined in the land 63 and a band 263 subsequently welded to the land. It should be understood that the antenna pathway can be formed using other fabrication methods. Details of the antenna elements are disclosed in U.S. Pat. No. 5,530,358 to Wisler et al and in U.S. Pat. No. 5,138,263 to J. Towle, both of which are hereby incorporated into this disclosure by reference.

Figure 4:
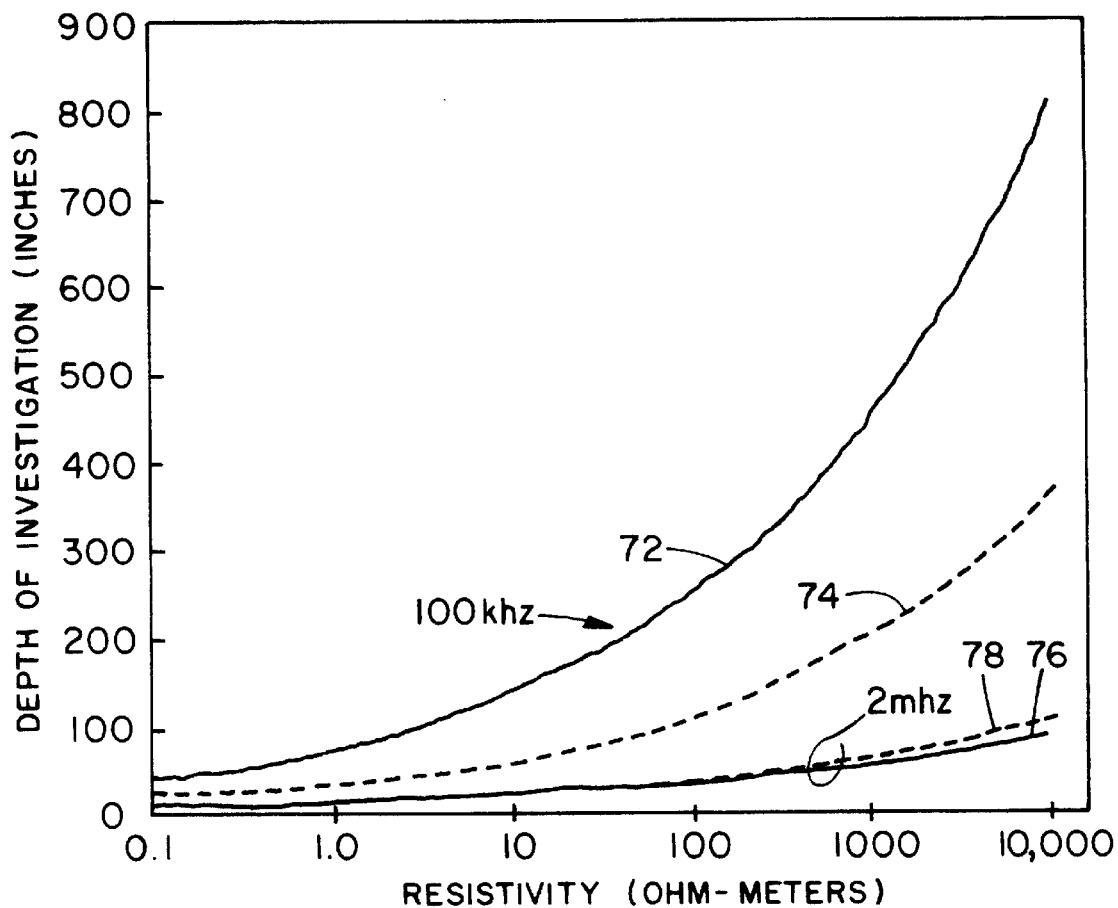
FIG. 4 is a plot of depth of investigation of the tool as a function of formation resistivity, operating at the lowest and highest operating frequencies, compared with depth of investigation of the best known prior art system operating at its lowest and highest operating frequencies.

By using operating frequency of 100 kHz or lower along with higher operating frequencies, and by using the previously discussed transmitter-receiver group spacings, the depth of investigation of the tool is greater than any known prior art EWP resistivity logging system. This increase in depth of investigation is shown in FIG. 4, which is a plot of depth of investigation (in inches) versus formation resistivity (in ohm-meters). Depth of investigation is defined as a radial dimension encompassing material from which 50% of a measured signal originates. Curve 72 is the response of the transmitter-receiver groups T7 and R3, R4, and T8 and R3, R4 operating at 100 kHz. Curve 74 represents the maximum depth of investigation of the best known prior art system, which uses a minimum operating frequency of 400 kHz. Curves 76 is the response of the transmitter groups T1 and R1, R2, and T2 and R1, R2 operating at 2 MHz. Curve 76 represents the shallowest depth of investigation of the present system. Curve 78 represent the comparable shallowest depth of investigation of the same best known prior art system also operating at 2 MHz. The shallow depths of investigation are essentially the same, with the present system being slightly deeper at higher formation resistivities. The present system's depths of investigation span the area between curve 76 and curve 72 while the prior art system only spans the area between curve 78 and curve 74. As discussed previously, this increased depth of investigation of the present system is advantageous in obtaining true formation resistivity in highly invaded formations, in formations of high resistivity, in large boreholes and in other adverse borehole and formation conditions.

Figure 5A:
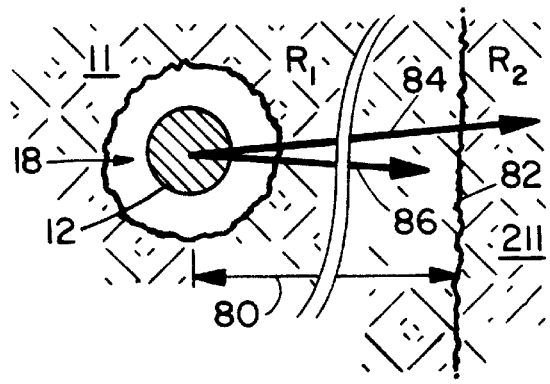
FIG. 5a illustrates conceptually the tool embodied in a geosteering system and illustrates the advantage of the greater depth of investigation when compared to the best known prior art system.

The increased depth of investigation is also advantageous when the tool is embodied as a geosteering system that measures the distance between the tool and adjacent formations of contrasting resistivity. FIG. 5a illustrates conceptually the tool embodied in a geosteering system, and illustrates the advantage of the greater depth of investigation when compared to the best known prior art system. The tool 12 is shown positioned within the borehole 18 which penetrates a formation 11 with a resistivity $R_1$. The formation 11 interfaces a formation 211 with a resistivity $R_2$ at an interface 82, which is a distance 80 from the center of the borehole. As is well known in the art, geosteering systems are design to detect a formation interface 82 remote from the borehole, and to preferably measure accurately the distance 80 from the tool within the borehole to the interface. Drilling direction can then be adjusted to avoid the adjacent formation or, alternately, to penetrate the adjacent formation with the advancing borehole. The arrow 84 represents conceptually the depth of investigation of the present system, which is sufficiently deep to "see" the adjacent formation with resistivity $R_2$. The depth of investigation of the best known prior art system is represented conceptually by the arrow 86, and is insufficient to "see" into the adjacent formation 211 from a distance 80. Distance 80 to the interface is determined by combining phase and amplitude responses of the plurality of transmitter-receiver groups at three operating frequencies using concepts previously referenced U.S. Pat. Nos. 4,899,112 and 4,968,940. Stated another way, multiple transmitter-receiver groups operating at three differing frequencies yield responses with multiple depths of investigation. As long as at least one measurement "sees" the adjacent formation 211, this measurement can be combined with the other measurements to determine the distance 80 of the interface 82. Additional details of geosteering methods and apparatus are disclosed in U.S. Pat. No. Re 35,386, which is hereby incorporated into this disclosure by reference.

Figure 5B:
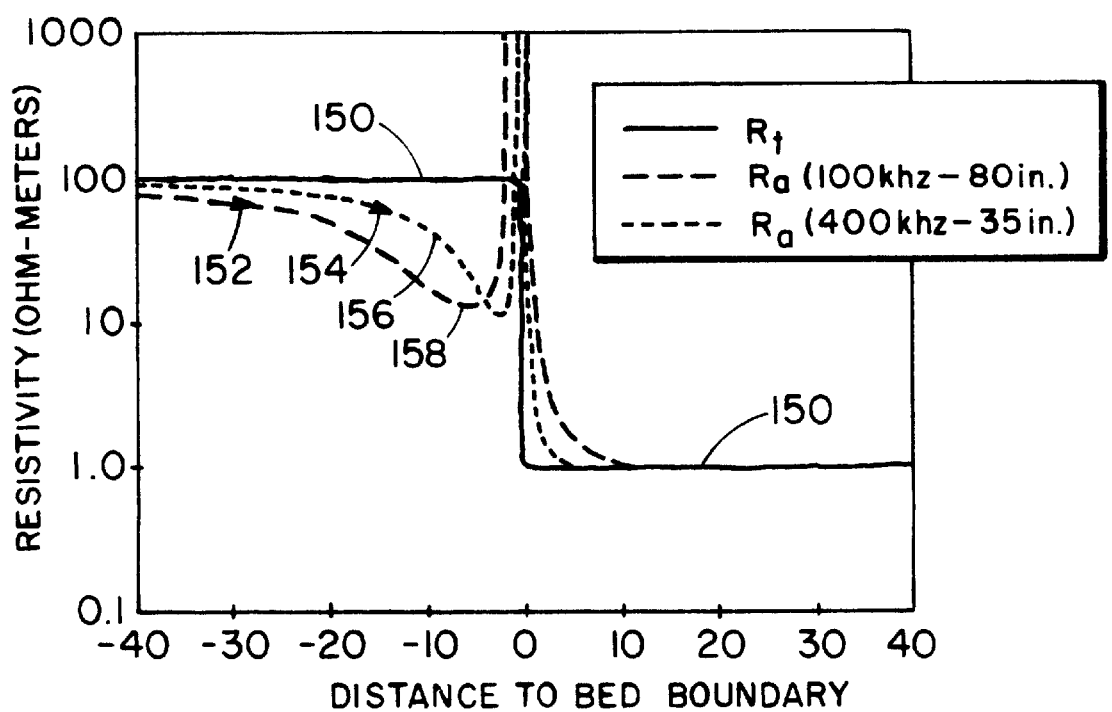
FIG. 5b is a plot of transmitter-receiver response across a bed boundary of contrasting resistivities for two spacings and at two operating frequencies.

FIG. 5b illustrates, with curve 150, a bed boundary of contrasting true resistivities $R_t$ of 100 and 1.0 ohm-meters. Curve 158 illustrates the apparent resistivity response $R_a$ of a first transmitter-receiver group, operating at 100 kHz and at a spacing of 80 inches, as a function of distance from the bed boundary. Point 152 illustrates the distance to the bed boundary at which 30 percent of the measured response results from formation on the opposing side of the bed boundary. Curve 156 illustrates $R_a$ of a second transmitter-receiver group, operating at 400 kHz and at a spacing of 35 inches, as a function of distance from the bed boundary. Point 154 illustrates the distance to the bed boundary at which 30 percent of the measured response of the second transmitter-receiver group results from formation on the opposing side of the bed boundary. It is apparent from the positions of points 152 and 154, and from the relative positions of the curves 156 and 158, that the first transmitter-receiver group operating at 100 kHz and at a spacing of 80 inches sees much deeper than the second transmitter-receiver group operating as a higher frequency and shorter spacing.

Figure 5C:
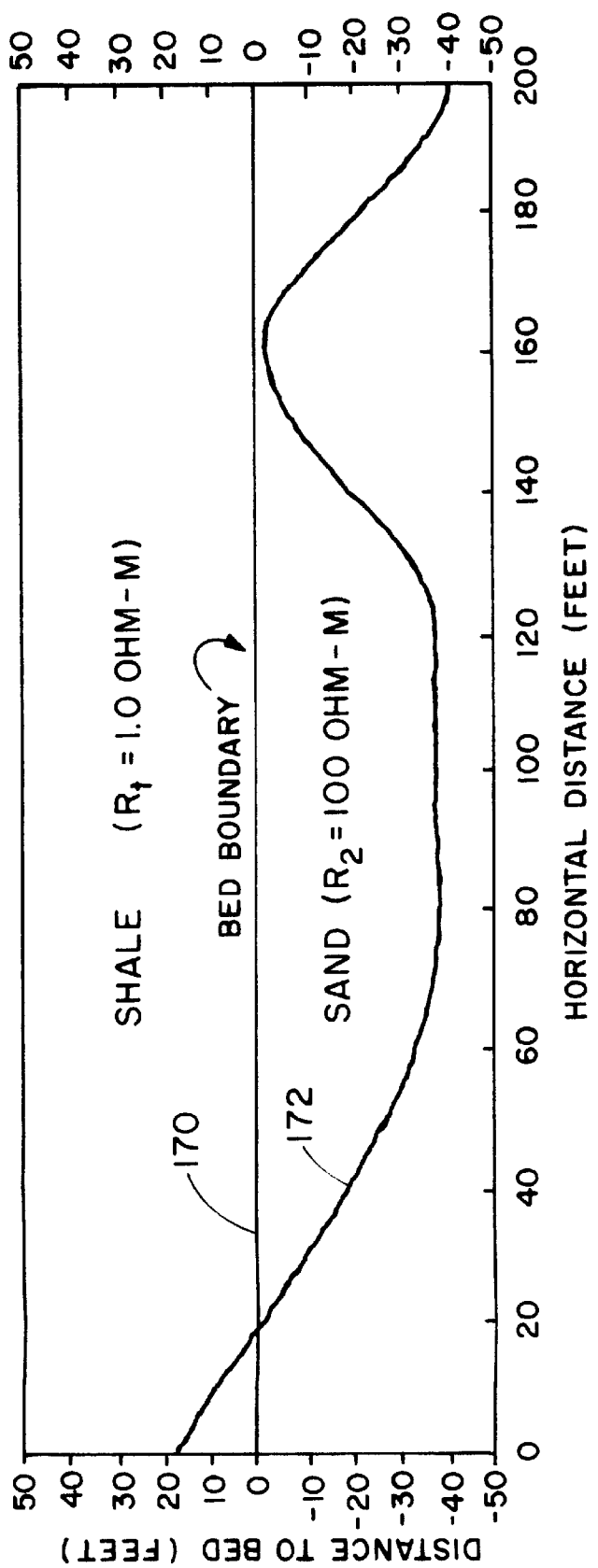
FIG. 5c illustrates position of a borehole with respect to a bed boundary of contrasting resistivity, plotted as a function of horizontal distance along the borehole.
Figure 5D:
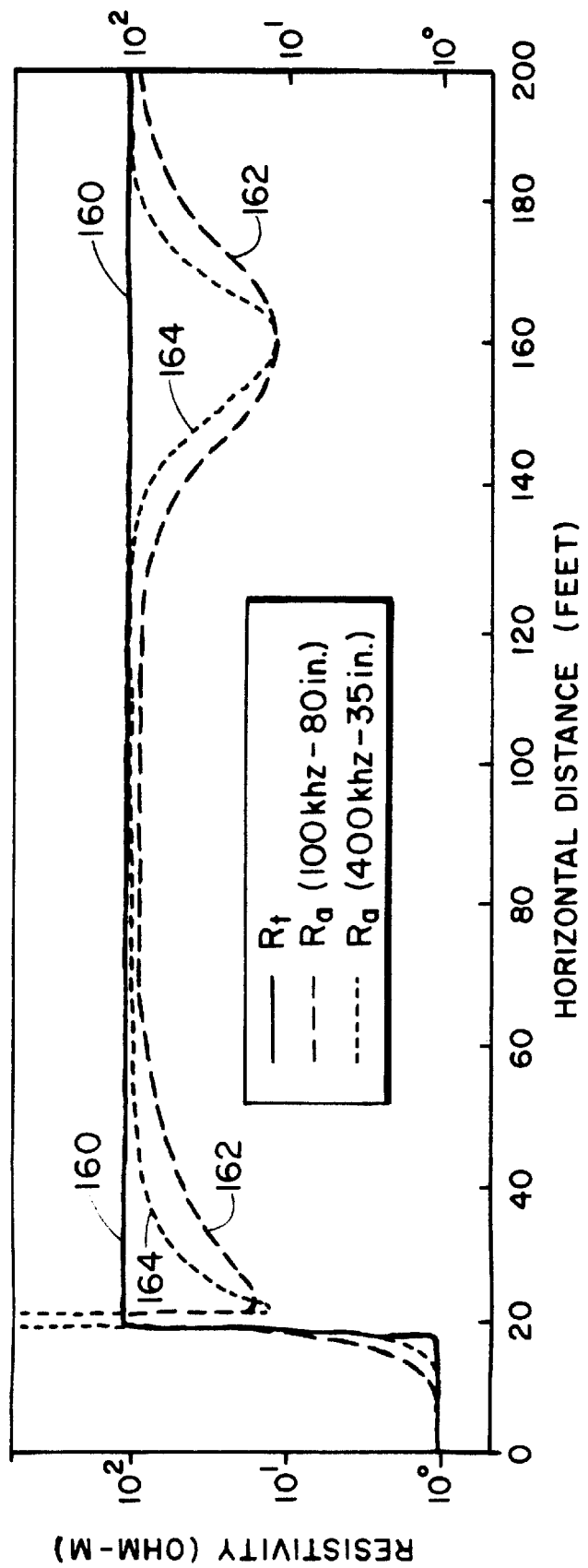
FIG. 5d illustrates corresponding transmitter-receiver response at two spacings and at two operating frequencies, plotted as a function of horizontal distance along the borehole.

FIG. 5c is a plot of distance of a borehole path 172 from a bed boundary 170 of contrasting resistivities, plotted as a function of horizontal distance along the borehole. The true resistivity $R_t$ of the upper formation (shale) in 1.0 ohm-meters, and the true resistivity $R_t$ of the lower formation (sand) is 100 ohm-meters. Curve 162 in FIG. 5d illustrates the corresponding apparent resistivity response $R_a$ of the first transmitter-receiver group operating at a frequency/spacing of 100 kHz/80 inches. Curve 164 illustrates corresponding $R_a$ response of the second transmitter-receiver group operating at a frequency/spacing of 400 kHz/35 inches. The curve 160 illustrates true resistivity $R_t$. Once again, it is apparent that the first group operating at the lower frequency and greater spacing sees much deeper. As mentioned previously, distance from the borehole to the bed boundary 172 can be determined by combining values of $R_a$ measured by the first and second transmitter-receiver groups.

Stainless steel is typically used to fabricate the tubular member 12. The lands 63 and inner surfaces of the slots 60 are typically stainless steel. The efficiency of both transmitters and receivers can be increased by modifying the antenna pathways and the slots. FIG. 6 illustrates a cross section B–B' through a land 63 where all surfaces of the antenna pathway 70 have been coated or lined with a highly conductive material such as copper or silver. This is especially important in the transmitter-receiver groups operating at the lowest frequency of 100 kHz and at maximum axial spacings. FIG. 7 illustrates a cross section A–A' through an axial slot 60 all exposed surfaces not covered by the material 66 are coated with the highly conducting material 90 thereby further increasing efficiency. FIG. 8 illustrated a cross section B–B' through a land 63 wherein the inner surface of the antenna pathway 70 are surfaced with high conducting material 90. Furthermore, the outer band 90 which defines a portion of the pathway is also fabricated with highly conducting material 90. This further increases antenna efficiency.

While the foregoing disclosure is directed toward the preferred embodiments of the invention, the scope of the invention is defined by the claims, which follow.

What is claimed is:

1. A electromagnetic wave propagation resistivity logging system comprising:
   (a) a tubular housing;
   (b) a plurality of transmitter-receiver groups axially spaced along said tubular housing and wherein
      (i) each said transmitter-receiver group comprises at least one transmitter assembly and two receiver assemblies,
      (ii) each said transmitter-receiver group is operated at two or more of three operating frequencies, and
      (iii) the lowest of said operating frequencies is within a range of about 20 kHz to about 100 kHz;
   (c) electronic circuitry for activating said at least one transmitter assembly in each said transmitter-receiver group and for recording induced signals in each said receiver assembly of each said transmitter-receiver group; and
   (d) a processor programmed to combining said recorded induced signals to yield a measure of resistivity of material in the vicinity of said tubular housing.

2. The system of claim 1 wherein said transmitter-receiver groups are symmetrically disposed on opposing sides of a reference point on said tubular housing.

3. The system of claim 2 wherein two of said operating frequencies are about 400 kHz and about 2 MHz.

4. The system of claim 1 wherein said plurality of transmitter-receiver groups comprises a total of eight transmitter assemblies and four receiver assemblies.

5. The system of claim 1 wherein each said transmitter assembly and each receiver assembly comprises:
   (a) alternating land members and axial slots wherein
      (i) an outer radius defining the periphery of said land members is essentially the same as the outer radius of said tubular housing,
      (ii) each of said axial slots is defined by adjacent land members and an inner surface defined by a radius less than said outer radius, and
      (iii) an antenna pathway traverses each said land member;
   (b) an antenna which is
      (i) essentially circular and defines a plane essentially perpendicular to the major axis of said tubular housing, and
      (ii) passes through each said land member within said antenna pathway; and wherein
   (c) said antenna can be operated as a transmitter or as a receiver.

6. The system of claim 5 wherein magnetic reluctance material is affixed to said inner surface.

7. The system of claim 1 further comprising:
   (a) a conveyance unit disposed at the surface of the earth; and
   (b) a conveyance member with a first end connected to said tubular housing and a second end connected to said conveyance unit thereby allowing said conveyance unit to convey said tubular housing along a well borehole.

8. The system of claim 7 wherein:
   (a) said conveyance unit is a drilling rig; and
   (b) said conveyance member is a drill string.

9. The system of claim 7 wherein:
   (a) said conveyance system is a wireline draw works; and
   (b) said conveyance member is a wireline.

10. The system of claim 5 wherein surfaces defining said antenna pathway are coated with highly conducting material.

11. The system of claim 5 wherein surfaces defining said axial slot are coated with highly conductive material.

12. A method for measuring resistivity of material penetrated by a borehole, comprising the steps of:
   (a) providing a tubular housing;
   (b) axially spacing along said tubular housing a plurality of transmitter-receiver groups, wherein
      (i) said groups are symmetrically disposed as group pairs on opposing sides of a reference point on said tubular housing,
      (ii) each said group comprises one transmitter assembly and two receiver assemblies,
      (iii) each said transmitter-receiver group is operated at two or more of three operating frequencies, and
      (iv) the lowest of said operating frequencies is within a range of about 20 kHz to about 100 kHz;
   (c) activating said transmitter assembly in a first transmitter-receiver group of a group pair and measuring signals induced in said two receiver assemblies of said first transmitter-receiver group;
   (d) activating said transmitter assembly in a second transmitter-receiver group of said group pair and measuring signals induced in said two receivers of said second transmitter-receiver group,
   (e) repeating steps (c) and (d) for each of said group pairs at each of said two or more operating frequencies for each of said group pairs; and
   (f) combining said measured signals to determine said resistivity of said material.

13. The method of claim 12 wherein said two of said three operating frequencies are about 400 kHz and about 2 MHz.

14. The method of claim 12 wherein said plurality of transmitter-receiver groups comprises a total of eight transmitter assemblies and four receiver assemblies forming eight transmitter-receiver groups and four group pairs.

15. The method of claim 12 comprising the additional steps of providing each said transmitter and receiver assembly by:
   (a) forming alternating land members and axial slots along said tubular member, wherein (i) an outer radius defining the periphery of said land members is essentially the same as the radius of said tubular housing,
(ii) each of said axial slots is defined by adjacent land members and an inner surface defined by a radius less that said outer radius, and
(iii) an antenna pathway traverses each said land member;
(b) providing an antenna which is
(i) essentially circular and defines a plane essentially perpendicular to the major axis of said tubular housing, and
(ii) passes through each said land member within said antenna pathway; and
(c) operating said antenna as a transmitter or as a receiver.

16. The method of claim 15 comprising the additional step of affixing a magnetic reluctance material to said inner surface.

17. The method of claim 12 further comprising the additional steps of:
(a) disposing a conveyance unit at the surface of the earth; and
(b) providing a conveyance member with a first end connected to said tubular housing and with a second end connected to said conveyance unit thereby allowing said conveyance unit to convey said tubular housing along a well borehole.

18. The method of claim 17 wherein:
(a) said conveyance unit is a drilling rig; and
(b) said conveyance member is a drill string.

19. The system of claim 17 wherein:
(a) said conveyance unit is a wireline draw works; and
(b) said conveyance member is a wireline.

20. The method of claim 15 comprising the additional step of coating surfaces defining said antenna pathway with highly conducting material.

21. The method of claim 15 comprising the additional step of coating surfaces defining said axial slot with highly conductive material.

22. A electromagnet wave propagation resistivity logging system comprising:
(a) a tubular housing; and
(b) four group pairs wherein
(i) each said group pair comprises two transmitter-receiver groups disposed axially and symmetrically on opposing sides of a reference point on said tubular housing,
(ii) each transmitter-receiver group comprises one transmitter assembly and two receiver assemblies,
(iii) said transmitter assemblies of a first of said group pairs operate sequentially at frequencies of about 100 kHz and about 400 kHz at a first axial spacing from said reference point,
(iv) said transmitter assemblies of a second of said group pairs operate sequentially at frequencies of about 400 kHz and about 2 MHz at a second axial spacing from said reference point,
(v) said transmitter assemblies of a third of said group pairs operate sequentially at frequencies of about 400 kHz and about 2 MHz at a third axial spacing from said reference point,
(vi) said transmitter assemblies of a fourth of said group pairs operate sequentially at frequencies of about 400 kHz and about 2 MHz at a fourth axial spacing from said reference point, and
(vii) said first spacing is greater than said second spacing, and said second spacing is greater than said third spacing, and said third spacing is greater than said fourth spacing.

23. The system of claim 22 wherein each of said transmitter and receiver assemblies comprises:
(a) alternating land members and axial slots wherein
(i) an outer radius defining the periphery of said land members is essentially the same as the radius of said tubular housing,
(ii) each of said axial slots is defined by adjacent land members and an inner surface defined by a radius less that said outer radius, and
(iii) an antenna pathway traverses each said land member;
(b) an antenna which is
(i) essentially circular and defines a plane essentially perpendicular to the major axis of said tubular housing, and
(ii) passes through each said land member within said antenna pathway; and wherein
(c) said antenna can be operated as a transmitter or as a receiver;
(d) magnetic reluctance material is affixed to said inner surface;
(e) surfaces defining said antenna pathway are coated with highly conducting material; and
(f) surfaces defining said axial slot are coated with highly conductive material.

24. A electromagnetic wave propagation logging method for measuring resistivity of a formation penetrated by a borehole, the method comprising the steps of:
(a) providing a tubular housing;
(b) axially and symmetrically disposing each of four group pairs on opposing sides of a reference point on said tubular housing, wherein
(i) each said group pair comprises a two transmitter-receiver groups axially and symmetrically disposed on opposing sides of said reference point,
(ii) each transmitter-receiver group comprises one transmitter assembly and two receiver assemblies,
(iii) said transmitter assemblies in a first of said group pairs operate sequentially at frequencies of about 100 kHz and about 400 kHz at a first axial spacing from said reference point,
(iv) said transmitter assemblies in a second of said group pairs operate sequentially at frequencies of about 400 kHz and about 2 MHz at a second axial spacing from said reference point,
(v) said transmitter assemblies in a third of said group pairs operate sequentially at frequencies of about 400 kHz and about 2 MHz at a third axial spacing from said reference point,
(vi) said transmitter assemblies in a fourth of said group pairs operate sequentially at frequencies of about 400 kHz and about 2 MHz at a fourth axial spacing from said reference point, and
(vii) said first spacing is greater than said second spacing, and said second spacing is greater than said third spacing, and said third spacing is greater than said fourth spacing;
(c) providing said transmitter assemblies and said receiver assemblies with:
(i) alternating land members and axial slots wherein an outer radius defining the periphery of said land members is essentially the same as the radius of said tubular housing, each of said axial slots is defined by adjacent land members and an inner surface defined by a radius less that said outer radius, and an antenna pathway traverses each said land member, (ii) an antenna which is essentially circular and defines a plane essentially perpendicular to the major axis of said tubular housing each said land member, and passes through each said land member within said antenna pathway, and wherein (iii) said antenna can be operated as a transmitter or as a receiver, (iv) a magnetic reluctance material is affixed to said inner surface, (v) surfaces defining said antenna pathway are coated with highly conducting material, and (iv) surfaces defining said axial slot are coated with highly conductive material.

25. An electromagnetic wave propagation resistivity logging tool for evaluating subsurface earth formations, comprising:

(a) at least a first antenna mounted on the tool for transmitting at least three electromagnetic wave propagation signals, each signal at a different frequency;

(b) at least a second antenna mounted on the tool for receiving the least three electromagnetic wave propagation signals; and (c) a processor coupled to the receiver antenna to process the at least three received electromagnetic wave propagation signals to yield measurements of resistivity of formations of at least three depths of investigation.

26. An electromagnetic wave propagation resistivity logging tool of claim 25 further including at least a third antenna mounted on the tool for transmitting at least three electromagnetic wave propagation signals.

27. An electromagnetic wave propagation resistivity logging tool of claim 25 further including at least a third antenna mounted on the tool for receiving the at least three electromagnetic wave propagation signals.

28. An electromagnetic wave propagation resistivity logging tool for evaluating subsurface earth formations, comprising:

(a) at least three pairs of antennas mounted on the tool for transmitting electromagnetic wave propagation signals of first and second frequencies;

(b) at least a forth pair of antennas mounted on the tool for transmitting electromagnetic wave propagation signals of at least second and third frequencies;

(c) at least a first pair of antennas mounted on the tool for receiving electromagnetic wave propagation signals of first and second frequencies;

(d) at least a second pair of antennas mounted on the tool for receiving electromagnetic wave propagation signals at second and third frequencies; and (e) a processor coupled to the first and second pairs of receiver antennas to process the received electromagnetic wave propagation signals to yield measurements of resistivity of formations.

29. The electromagnetic wave propagation resistivity logging tool of claim 28 further comprising at least one of the three pairs of transmitting antennas transmitting electromagnetic wave propagation signals at the third frequency.

* * * * *